United States Patent
Ohashi

(10) Patent No.: US 6,637,900 B2
(45) Date of Patent: Oct. 28, 2003

(54) MIRROR ASSEMBLY AND METHOD FOR ASSEMBLING THE SAME

(75) Inventor: Masatsugu Ohashi, Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 10/017,379

(22) Filed: Dec. 18, 2001

(65) Prior Publication Data
US 2002/0085295 A1 Jul. 4, 2002

(30) Foreign Application Priority Data
Dec. 28, 2000 (JP) ........................... 2000-402729

(51) Int. Cl.[7] ................................. B60R 1/06
(52) U.S. Cl. ................. 359/871; 359/838; 359/872; 359/900
(58) Field of Search ................ 359/872, 873, 359/874, 876, 877, 871, 900, 838

(56) References Cited

U.S. PATENT DOCUMENTS

| | | | | |
|---|---|---|---|---|
| 4,506,954 A | * | 3/1985 | Enomoto | 359/874 |
| 5,864,438 A | * | 1/1999 | Pace | 359/841 |
| 6,220,716 B1 | * | 4/2001 | Asaka | 359/871 |
| 6,239,928 B1 | * | 5/2001 | Whitehead et al. | 359/871 |
| 6,394,616 B1 | * | 5/2002 | Foote et al. | 359/841 |
| 6,447,129 B2 | * | 9/2002 | Hayashi et al. | 359/879 |

FOREIGN PATENT DOCUMENTS

| | | | |
|---|---|---|---|
| EP | 0 290 233 A2 | * | 11/1988 |
| JP | 11-208374 A | * | 8/1999 |
| JP | 2000-108784 A | * | 4/2000 |

* cited by examiner

*Primary Examiner*—John Juba
(74) *Attorney, Agent, or Firm*—Nixon Peabody LLP; Thomas W. Cole

(57) ABSTRACT

A mirror assembly for a vehicle includes a visor which houses a mirror main body (a mirror), a stay cover provided between the visor and the vehicle, and a base which is assembled so as to pass through the stay cover. In the present invention, in a state in which inclined surfaces formed at both the stay cover and the visor press-contact one another, the stay cover is nipped by the base and the visor. The stay cover is held by nipping force of the base and the visor such that the visor and the stay cover are assembled without gaps therebetween, without a need to separately prepare a fixing member of the stay cover.

20 Claims, 13 Drawing Sheets

MIRROR ASSEMBLY AND METHOD FOR ASSEMBLING THE SAME

BACKGROUND OF THE INVENTION

1. Field of the Invention

The present invention relates to a mirror assembly such as a door mirror or the like which is mounted to a door of a vehicle.

2. Description of the Related Art

Door mirrors, which are mounted to the outer side of the doors at the driver's seat side and at the front passenger's seat side, are an example of equipment which a vehicle occupant uses to confirm the region substantially at the rear side of the vehicle.

Such a door mirror has a visor which is formed as a box form or a bowl form which opens substantially toward the rear of the vehicle, and which houses a mirror main body (a mirror) in a vicinity of the opening portion. A stay cover is provided between the visor and the vehicle, and a base passes through the stay cover. The base is mechanically connected to both the visor and the vehicle body, and the visor is connected to the vehicle body by the base.

In door mirrors up to now, when assembling the door mirror, both the visor and the stay cover are screwed individually to the base. Thus, costs for parts are required, and a work process at the time of assembly is required.

Further, in consideration of the external appearance of the vehicle, the visor and the stay cover must be assembled without gaps therebetween. However, because each of the visor and the stay cover are assembled to the base, there is a strong possibility that an uneven gap will be formed between the visor and the stay cover due to errors in assembling the respective parts or the like.

SUMMARY OF THE INVENTION

In view of the aforementioned, an object of the present invention is to provide a mirror assembly which is low cost, and in which the number of assembly processes can be reduced, and whose external appearance is improved.

A first aspect of the present invention is a mirror assembly comprising: a visor at which a predetermined direction side with respect to a vehicle is formed at a bottom portion which is open, and which houses, at an inner side, a mirror main body having a reflecting surface; a base provided at a vehicle side of the visor, and connecting the visor to the vehicle; a cover provided between the visor and the vehicle, and covering the base; and a positioning portion provided at at least one of the cover and the visor, and due to the positioning portion engaging with another of the cover and the visor, the positioning portion positions an assembly position of the other of the cover and the visor with respect to the one of the cover and the visor. In the present invention, the cover is nipped by the visor and the base, and is held by nipping force of the visor and the base.

In accordance with the mirror assembly having the above-described structure, the visor, to which the mirror main body is mounted, is fixed to the base. By mounting the base to the vehicle, the visor is mounted to the vehicle via the base. Further, the base is covered by the cover, and the external appearance is thereby maintained.

Here, in the present mirror assembly, in a state in which another of the cover and the visor is engaged with the positioning portion provided at at least one of the cover and the visor, such that the other of the cover and the visor is positioned, the cover is nipped by the base and the visor, and is held by the nipping force of the base and the visor. As a result, at the time of fixing the cover, there is no need for a special fixing member or process for fixing the cover.

The mirror assembly of the present invention preferably includes a fastening device which passes through the cover along a direction of application of the nipping force or a direction opposite to the direction of application of the nipping force, from one of the visor and the base, and which is fastened to the other of the visor and the base, and which fixes the visor to the base.

In accordance with the mirror assembly including the above-described structure, the fastening device passes through the cover along the direction of application of the nipping force or a direction opposite thereto, from one of the visor and the base, and the fastening device is fastened to the other of the visor and the base. The visor and the base are thereby fixed, and the cover is fixed together therewith.

Here, as described above, because the fastening device is fastened and fixed along the direction of application of the nipping force, at the time when the visor and the base are fixed, the cover is fixed. Thus, fixing of the visor, the base and the cover can be carried out at one time.

In the mirror assembly of the present invention, preferably, press-contact surfaces, which press-contact one another along a direction which is inclined with respect to a direction of application of the nipping force, are the positioning portion, and the press-contact surfaces are provided further toward an inner side than respective outer peripheral portions of the visor and the cover.

In accordance with the mirror assembly including the above-described structure, the cover is held by the nipping force of the visor and the base. Thus, press-contact force is applied between the visor and the cover. The press-contact surfaces, which press-contact one another along a direction which is inclined with respect to the direction of application of the nipping force, are formed at both the visor and the cover. Due to the press-contact surfaces press-contacting one another, positioning of the cover with respect to the visor is carried out Further, because the press-contact surfaces are inclined as described above, stress at the time of press-contacting is dispersed. Flexure due to a concentration of stress can thereby be prevented. In this way, by preventing flexure due to a concentration of stress, the visor and the cover can contact each other well without any gaps at the respective outer peripheral portion sides thereof, and thus, the external appearance can be improved.

A second aspect of the present invention is a mirror assembly for mounting to a vehicle exterior, the mirror assembly comprising: (a) a visor housing a mirror; (b) a base including opposite ends, one end adapted for mounting to the vehicle, with the other end connecting to the visor; (c) a cover disposed between the visor and the vehicle and covering at least a portion the base when the assembly is mounted to the vehicle; and (d) positioning pins provided at at least one of the cover and visor, received at holes defined in the base, substantially positioning the cover according to a predetermined position relative to the visor and base when mounted to the vehicle, and at least a portion of the cover being nipped between the visor and the base for holding the cover.

A third aspect of the present invention is a method of assembling a mirror arrangement for a vehicle, the method comprising the steps of: (a) passing a base main body of a base through a through-hole formed in a stay cover and thereafter positioning the stay cover and base according to a predetermined position relative to tone another; (b) inserting the base main body into an opening portion formed in a side wall of the visor and thereafter arranging a peripheral wall of a visor and a peripheral wall of the stay cover to substantially coincide; and (c) fastening the base and the visor with a base portion of the base and the peripheral wall of the visor nipping the stay cover therebetween after the step of inserting the base main body into an opening portion.

DESCRIPTION OF THE PREFERRED EMBODIMENTS

<Structure of Visor 12>

Figure 1:
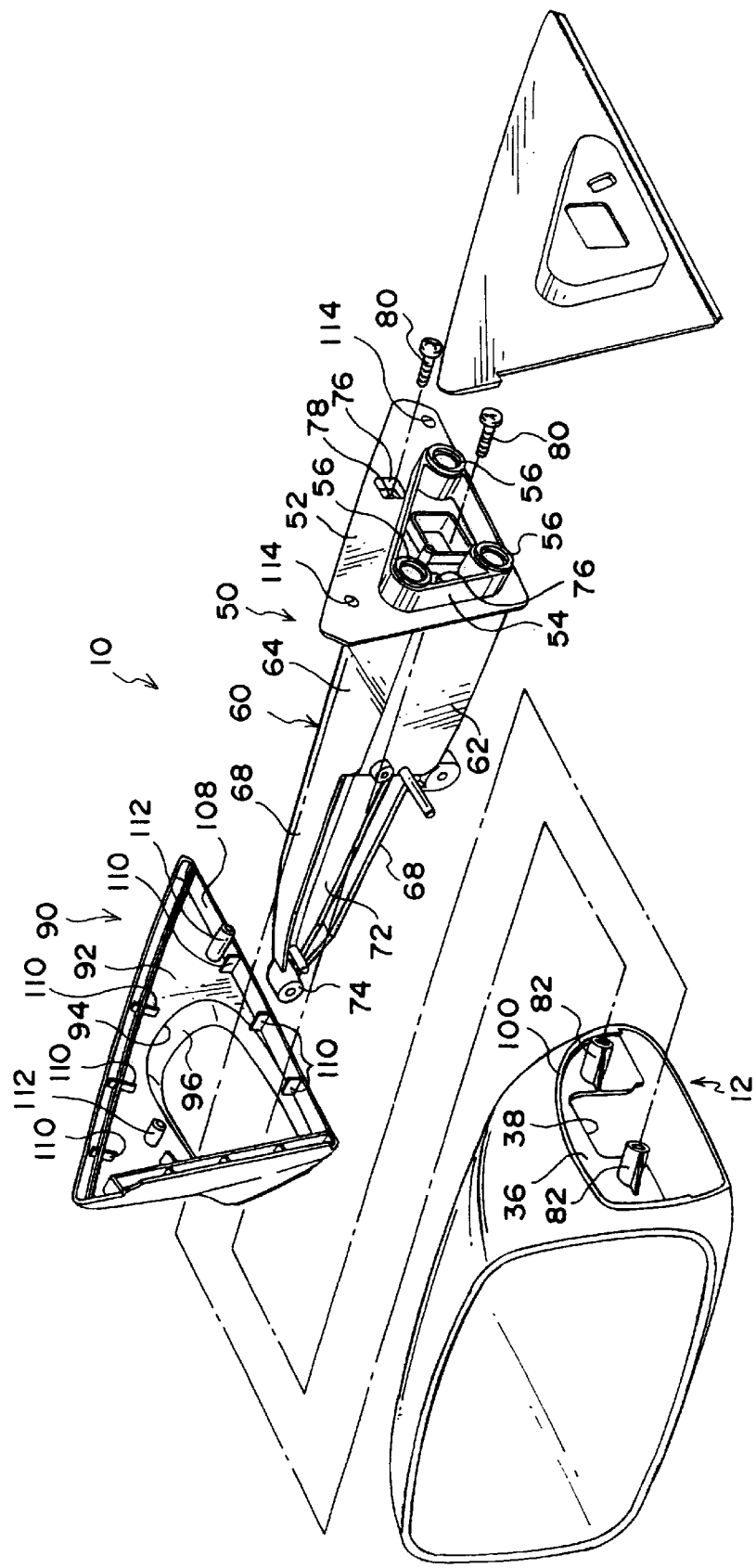
FIG. 1 is a schematic perspective view of a mirror assembly relating to an embodiment of the present invention.

The structure of a door mirror 10, which serves as a mirror assembly relating to an embodiment of the present invention, is shown in an exploded perspective view in FIG. 1.

As shown in FIG. 1, the door mirror 10 includes a visor 12. The visor 12 is molded integrally from a synthetic resin material in a substantial box shape or a substantial bowl shape which opens substantially toward the rear of the vehicle (not shown) in the state in which the visor 12 is mounted to the vehicle.

Figure 2:
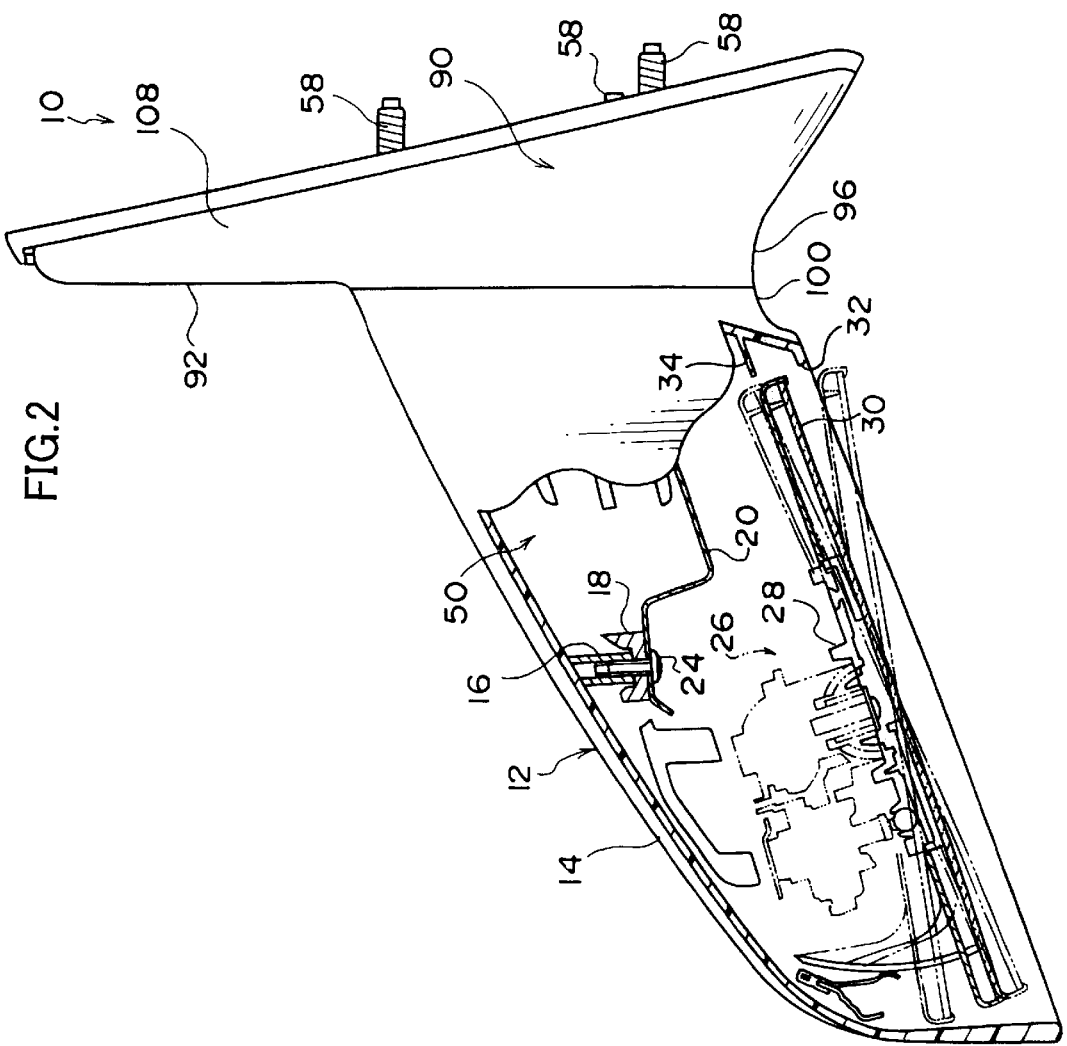
FIG. 2 is a partially broken plan view of the mirror assembly relating to the embodiment of the present invention.
Figure 5:
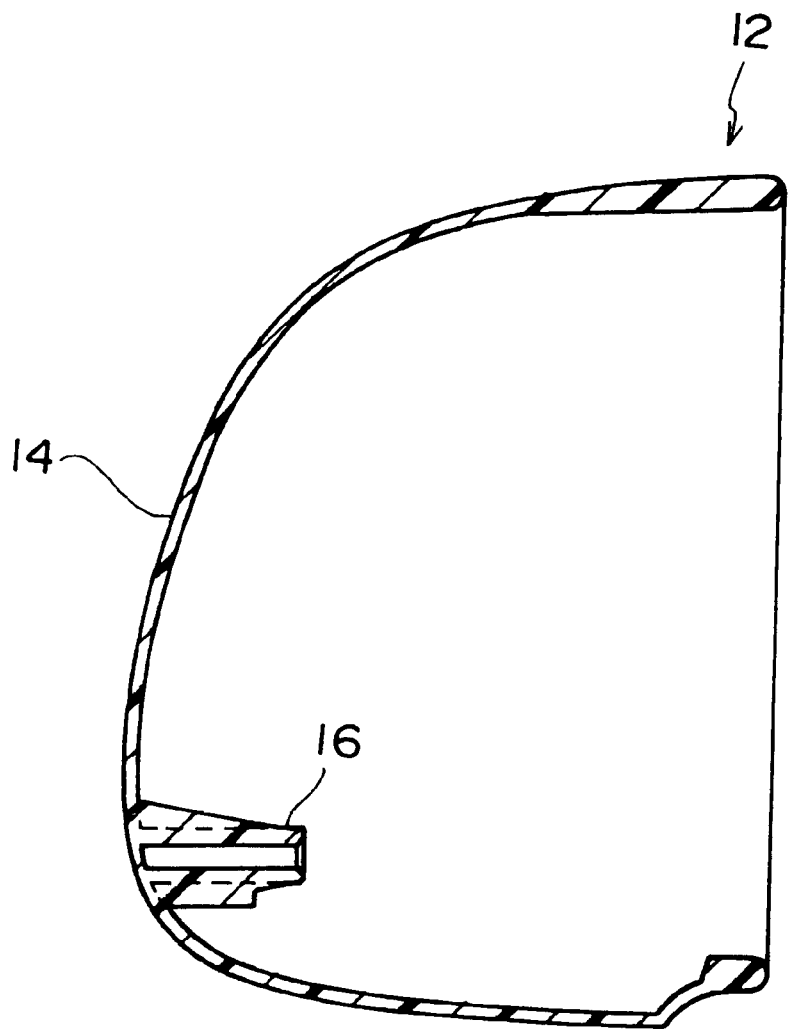
FIG. 5 is a side sectional view of the visor.

As shown in FIGS. 2 and 5, a boss 16 stands erect toward the opening direction side of the visor 12 from a bottom portion 14 of the visor 12. The boss 16 is formed on the whole as a hollow cylinder, and a receiving plate 18 is provided at an open end thereof. A supporting plate 20 is provided at the side of the receiving plate 18 opposite the side at which the boss 16 is provided. A male screw 24 passes through the supporting plate 20 and the receiving plate 18. Further, the male screw 24 enters coaxially into the interior of the boss 16 and screws together with the inner peripheral portion of the boss 16. In this way, the supporting plate 20 is fixed at the interior of the visor 12.

A mirror driving unit 26 is held at the supporting plate 20. A driving device such as a motor or the like is mounted to the mirror driving unit 26, and a plate shaped holder 28 is mounted to the mirror driving unit 26. Due to the driving force of the driving device, the holder 28 can be rotated by a predetermined angle with the substantially vertical direction of the vehicle and the substantially left-right direction of the vehicle being the axial directions.

A mirror main body 30 is disposed at the inner side of the visor 12 and in a vicinity of the open end of the visor 12. The mirror main body 30 is formed in a plate shape whose direction of thickness is substantially along the opening direction of the visor 12, and a reflecting surface is formed at the visor 12 opening end side of the mirror main body 30. The bottom portion 14 side of the mirror main body 30 is fixed to the holder 28. Accordingly, due to the motor of the mirror driving unit 26 operating, the mirror main body 30 rotates integrally with the holder 28, and the orientation of the reflecting surface of the mirror main body 30 is thereby changed.

Figure 4:
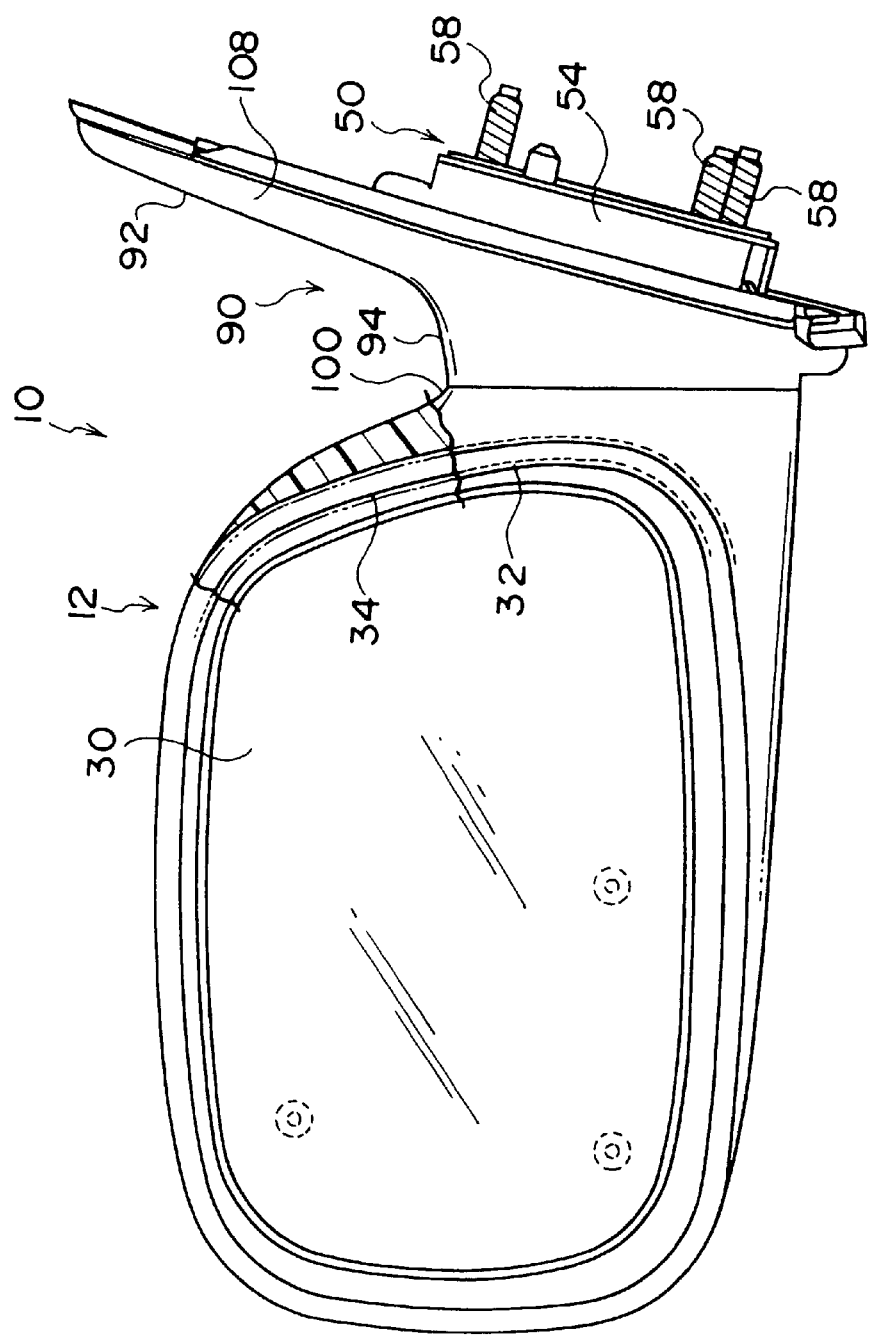
FIG. 4 is a partially broken front view of the mirror assembly relating to the embodiment of the present invention.

As shown in FIGS. 2 and 4, a collar portion 32 is formed toward the inner side of the opening end, at the portion, of the opening end of the visor 12, which portion is positioned at the vehicle body side when the door mirror 10 is mounted to the vehicle.

A shielding rib 34, which serves as a shielding portion, is formed so as to project from the inner peripheral portion of the visor 12, at a position which is further toward the bottom portion 14 side of the visor 12 than the collar portion 32. As shown in FIG. 2, the shielding rib 34 is formed in a plate shape which is thinner than the visor 12. The shielding rib 34 is formed to project from the inner peripheral portion of the visor 12 such that, when the mirror main body 30 is rotated around an axis with the axial direction being substantially the vertical direction of the vehicle until the portion, of the peripheral portions of the mirror main body 30, which portion which is positioned at the vehicle body side is displaced the furthest toward the bottom portion 14 side, the distal end portion of the shielding rib 34 opposes the vehicle body side outer peripheral portion of the mirror main body 30 substantially parallel to the reflecting surface of the door mirror 10.

Further, the dimension by which the shielding rib 34 projects from the inner peripheral portion of the visor 12 (i.e., the transverse dimension of the shielding rib 34) is set such that the shielding rib 34 does not interfere with the mirror main body 30 at the time when the mirror main body 30 rotates. However, the dimension by which the shielding rib 34 projects from the inner peripheral portion of the visor 12 (i.e., the transverse dimension of the shielding rib 34) is set such that the shielding rib 34 is positioned further toward the inner side of the visor 12 than a gap, along the direction of opening of the gap between the mirror main body 30 and the collar portion 32 at a regular rotational position of the mirror main body 30 (the state shown by the solid line in FIG. 2), and along the direction of opening of the gap between the collar portion 32 and the mirror main body 30 at the time when the vehicle body side outer peripheral portion of the mirror main body 30 is rotated the furthest toward the bottom portion 14 side.

Figure 3:
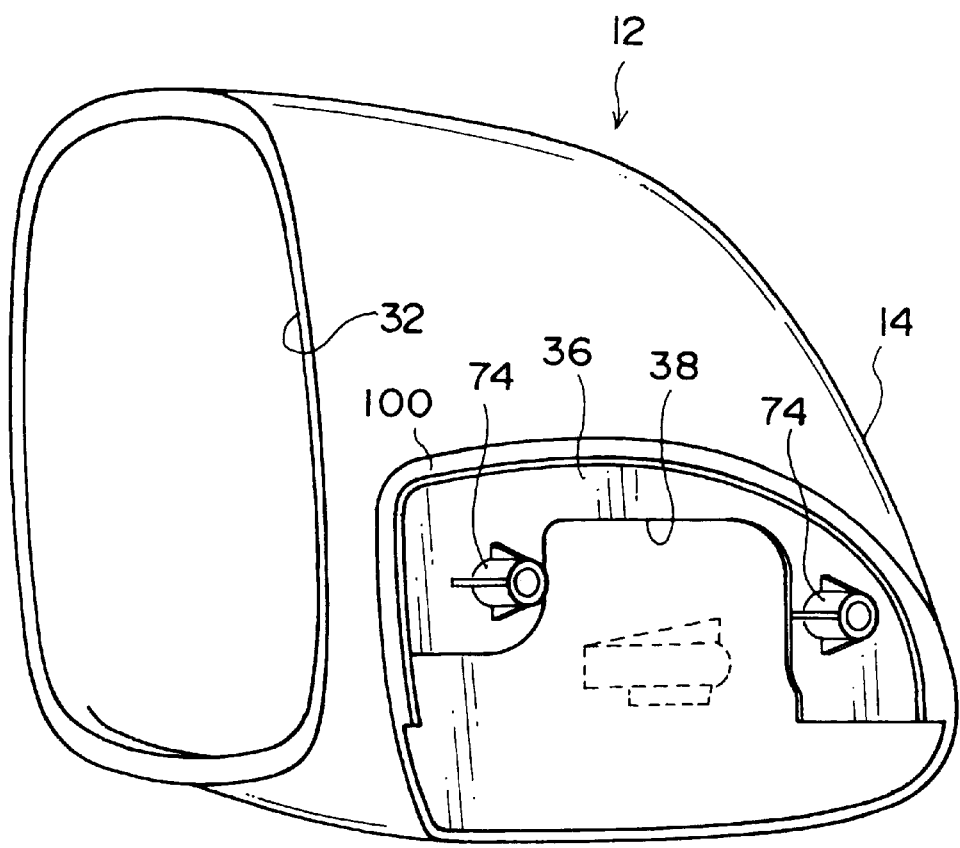
FIG. 3 is a side view of a visor as seen from a vehicle body.

Further, as shown in FIGS. 1 and 3, an opening portion 38 is formed in a side wall 36, at the vehicle body side, of the visor 12. A distal end side of a base 50 enters into the inner side of the visor 12 via this opening portion 38.

<Structure of Base 50>

Figure 6:
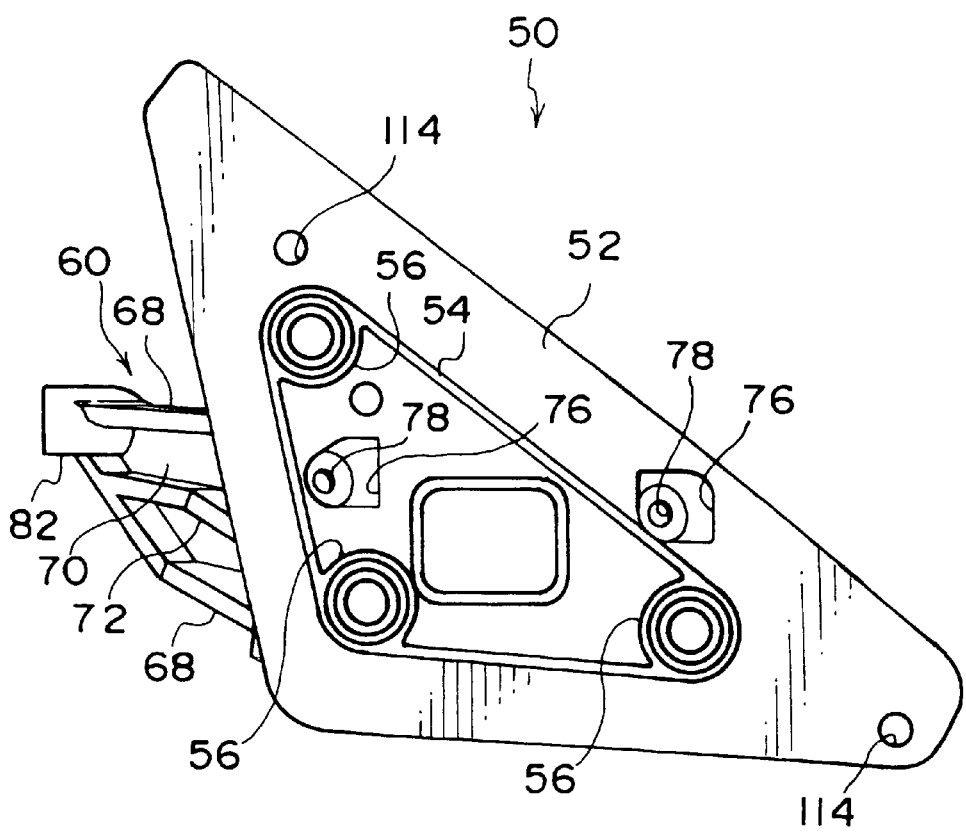
FIG. 6 is a side view of a base as seen from the vehicle body.

The base 50 is a molded product which is formed overall from metal or a synthetic resin material. As shown in FIGS. 1 and 6, the base 50 is equipped with a substantially triangular, substantially plate-shaped base portion 52. A frame portion 54, which is tubular and which opens along the direction of thickness of the base portion 52, is formed integrally with the vehicle body side of the base portion 52. The frame portion 54 has a configuration which is substantially similar to that of the base portion 52 as seen along the direction of opening thereof. However, the frame portion 54 is a substantially triangular shape which is sufficiently smaller than the base portion 52. A boss 56, whose axial direction is substantially the direction of opening of the frame portion 54, is formed integrally at each of the corners of the frame portion 54. Bolts 58, which are shown in FIG. 4 and the like, are fixed to these bosses 56, and the bolts 58 are fixed to a supporting member (not shown) at the vehicle body side.

Figure 7:
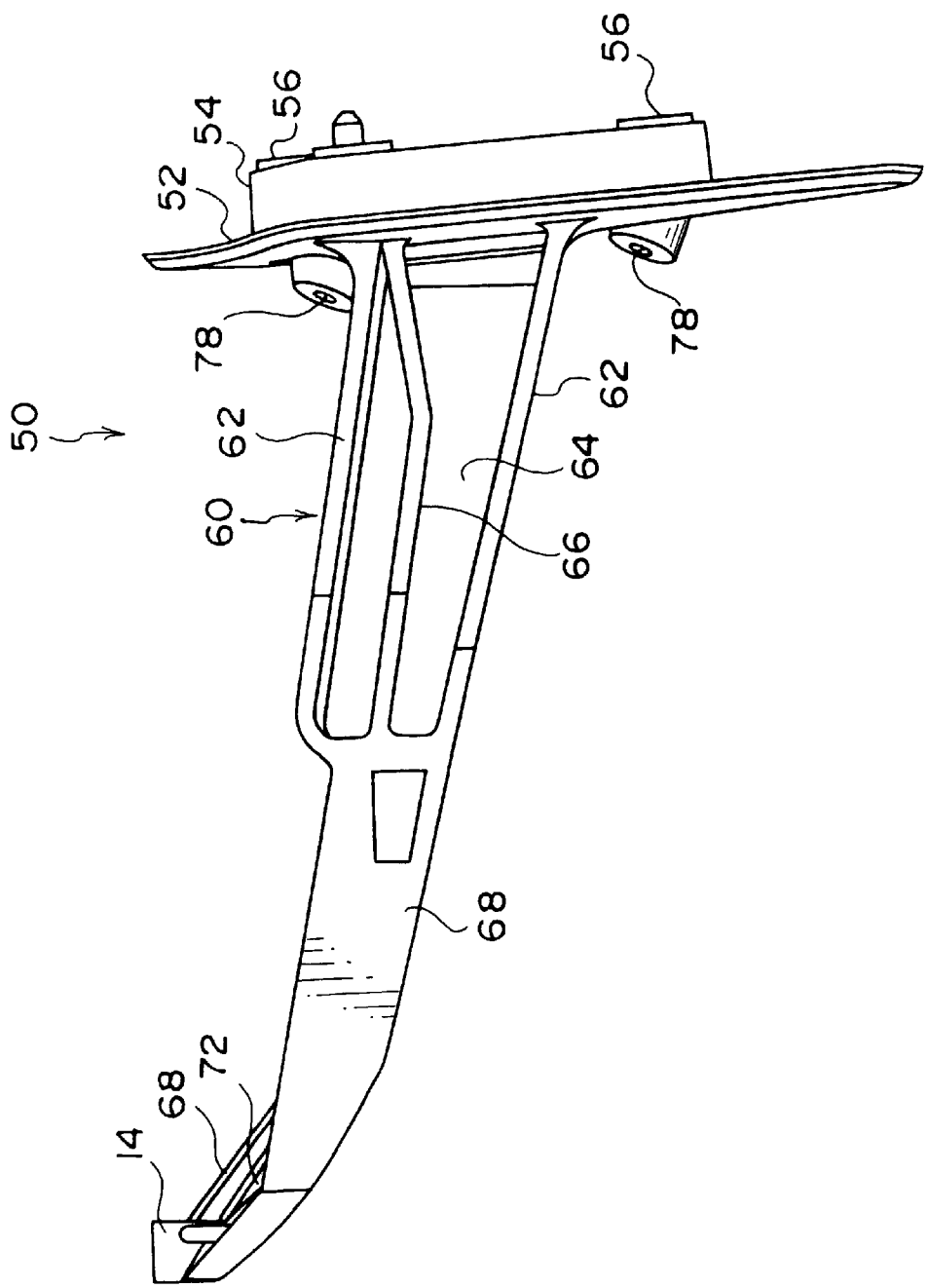
FIG. 7 is a bottom view of the base as seen from beneath.
Figure 8:
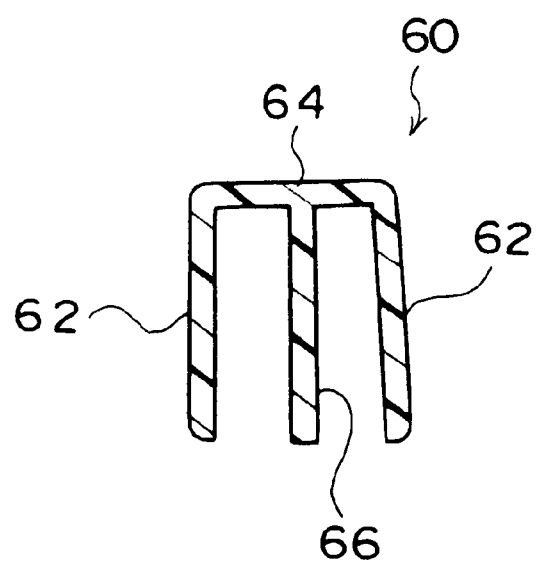
FIG. 8 is a cross-sectional view of a base main body at a front and rear walls portion.
Figure 9:
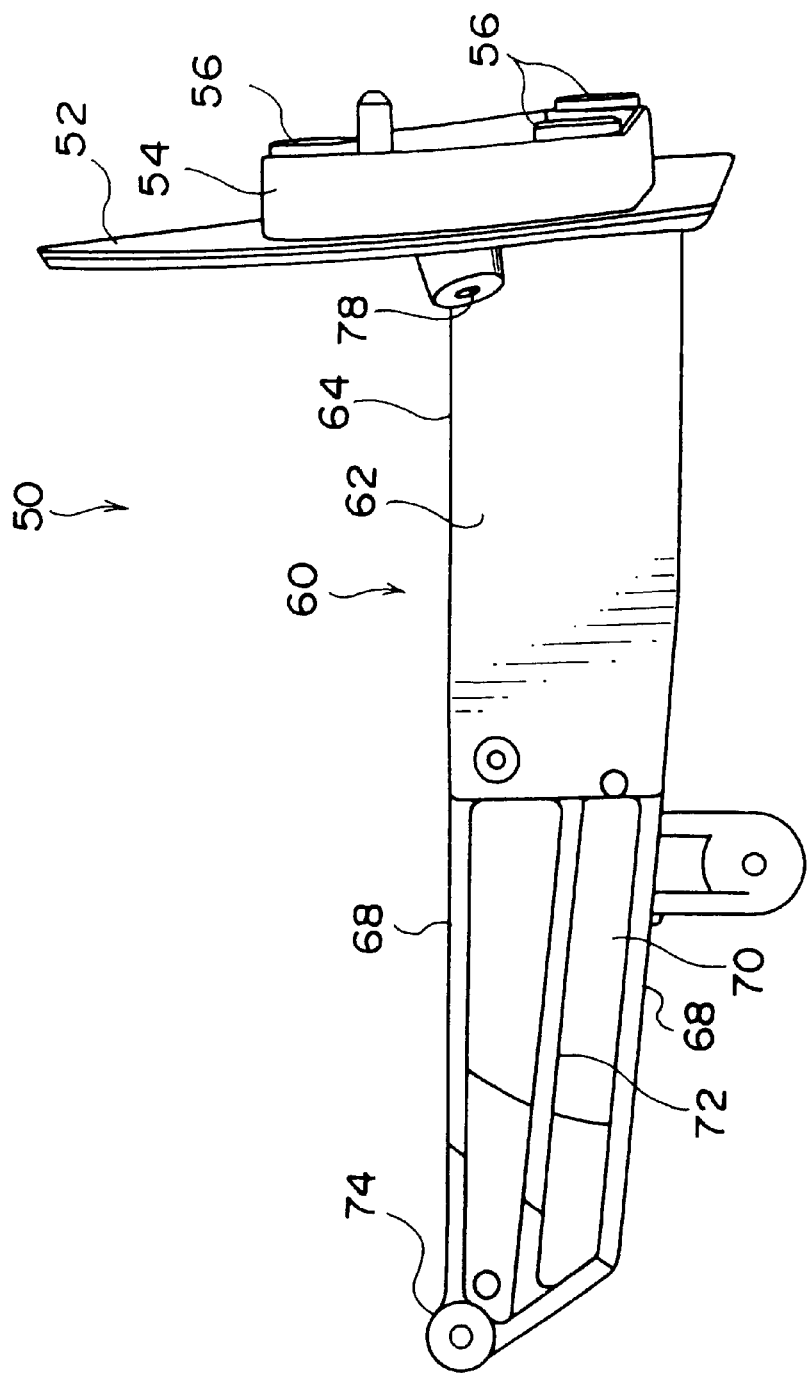
FIG. 9 is a front view of the base.

On the other hand, as shown in FIGS. 7 and 9, a base main body 60 is formed at the side of the base member 52 opposite the side at which the frame portion 54 is provided (i.e., the base main body 60 is formed at the side of the base member 52 opposite the vehicle body side thereof). The base main body 60 is provided with a pair of front and rear walls 62 which oppose one another substantially along the longitudinal direction of the vehicle. The longitudinal directions of the front and rear walls 62 run along a direction which is inclined substantially toward the vehicle longitudinal direction, with respect to the substantially vehicle left-right direction. Ones of longitudinal direction end portions of the front and rear walls 62 (i.e., the end portions thereof at the vehicle body side) are connected to the base portion 52. Further, an upper plate 64 is provided at the transverse direction upper sides (substantially the vehicle upper sides) of the front and rear walls 62. The longitudinal direction of the upper wall 64 is along the longitudinal direction of the front and rear walls 62. The transverse direction upper end portions of the front and rear walls 62 are connected integrally to the transverse direction both end portions of the upper wall 64. Accordingly, as shown in FIG. 8, at portions of the front and rear walls 62, the base main body 60 is formed in a substantially concave shape in cross-section, which opens substantially toward the bottom of the vehicle.

A plate-shaped first rib 66 is provided between the front and rear walls 62. The first rib 66 is formed as a plate shape whose longitudinal direction is substantially along the longitudinal direction of the longitudinal plates 62, and whose thickness direction is the direction in which the front and rear walls 62 oppose one another. However, at a side of the first rib 66 further toward one side than the longitudinal direction intermediate portion thereof (i.e., at the vehicle body side thereof), the first rib 66 is bent substantially toward the rear of the vehicle with respect to the other longitudinal direction side of the first rib 66, and is joined to the base portion 52 in the vicinity of a joined portion of the base portion 52 and the front and rear wall 62 which is positioned relatively toward the substantially vehicle rear side among the pair of front and rear walls 62. Further, a transverse direction upper end portion of the first rib 66 is joined to the upper wall 64.

Longitudinal direction one end portions of a pair of upper and lower walls 68, which together with the front and rear walls 62 form the base main body 60, are connected to the other longitudinal direction end portions of the front and rear walls 62 and the first rib 66 (the end portions of the front and rear walls 62 and the first rib 66 at the side opposite the vehicle body).

The longitudinal direction of the upper and lower walls 68 is substantially along the longitudinal direction of the front and rear walls 62. However, the thickness directions of the upper and lower walls 68 are substantially the vertical direction of the vehicle, and the upper and lower walls 68 oppose one another along the thickness directions thereof. A front wall 70, whose thickness direction is along the transverse direction of the upper and lower walls 68, is provided at the transverse direction rear end sides of the upper and lower walls 68. The front wall 70 is formed in a plate shape whose longitudinal direction is along the longitudinal direction of the upper and lower walls 68, and whose thickness direction is substantially along the transverse direction of the upper and lower walls 68. The front wall 70 is formed so as to extend from the other longitudinal direction end portion of the front and rear wall 62 which is positioned relatively toward the substantially vehicle front side among the front and rear walls 62.

Figure 10:
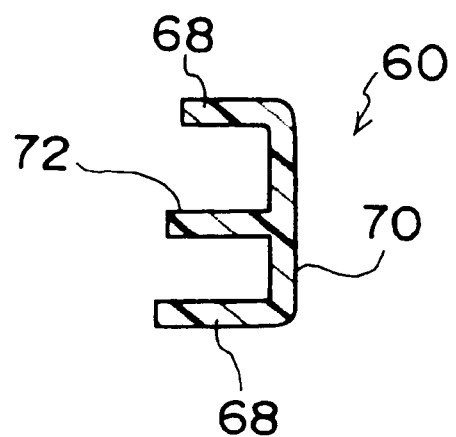
FIG. 10 is a cross-sectional view of the base main body at an upper and lower walls portion.

The transverse direction front end portions of the upper and lower walls 68 are connected integrally to the transverse direction both end portions of the front wall 70. Accordingly, as shown in FIG. 10, at portions of the upper and lower walls 68, the base main body 60 is formed in a substantially concave shape in cross-section, which opens substantially toward the vehicle rear side.

A plate-shaped second rib 72 is provided between the upper and lower walls 68. The second rib 72 is formed in a plate shape whose longitudinal direction is substantially along the longitudinal direction of the upper and lower walls 68, and whose thickness direction is the opposing direction of the upper and lower walls 68. One longitudinal direction end portion of the second rib 72 is joined to the longitudinal direction other end portions of the front and rear walls 62 and the first rib 66, and the transverse direction front end portion of the second rib 72 is joined to the front wall 70.

The longitudinal direction other end side of the upper and lower wall 68 which is positioned relatively toward the substantially vehicle lower side among the pair of upper and lower walls 68, is bent substantially toward the vehicle upper side. The longitudinal direction other end portion of the second rib 72 is connected to this bent portion. Further, a tubular boss 74, whose axial direction is along the substantially longitudinal direction of the vehicle, is formed at the longitudinal direction other end portions of the upper and lower walls 68. The previously-mentioned mirror driving unit 26 is screwed to the boss 74.

On the other hand, as shown in FIG. 6, a pair of opening portions 76 are formed in the base portion 52. The opening portions 76 are substantially square, and are open at one thickness direction side thereof (i.e., at the vehicle body side thereof). However, the opening portions 76 are more shallow than the thickness of the base portion 52, and each have a bottom at a thickness direction intermediate portion of the base portion 52. Further, a substantially circular through hole 78 is formed in the bottom of each opening portion 76.

Fixing screws 80, which serves as fastening devices, pass through the through holes 78, and are screwed into bosses 82 which are formed at the side wall 36 of the visor 12. In this way, the visor 12 and the base 50 are connected integrally.

Moreover, as shown in FIG. 1, a stay cover 90, which serves as a cover, is provided between the base portion 52 of the base 50 and the visor 12.

<Structure of Stay Cover 90>

Figure 11:
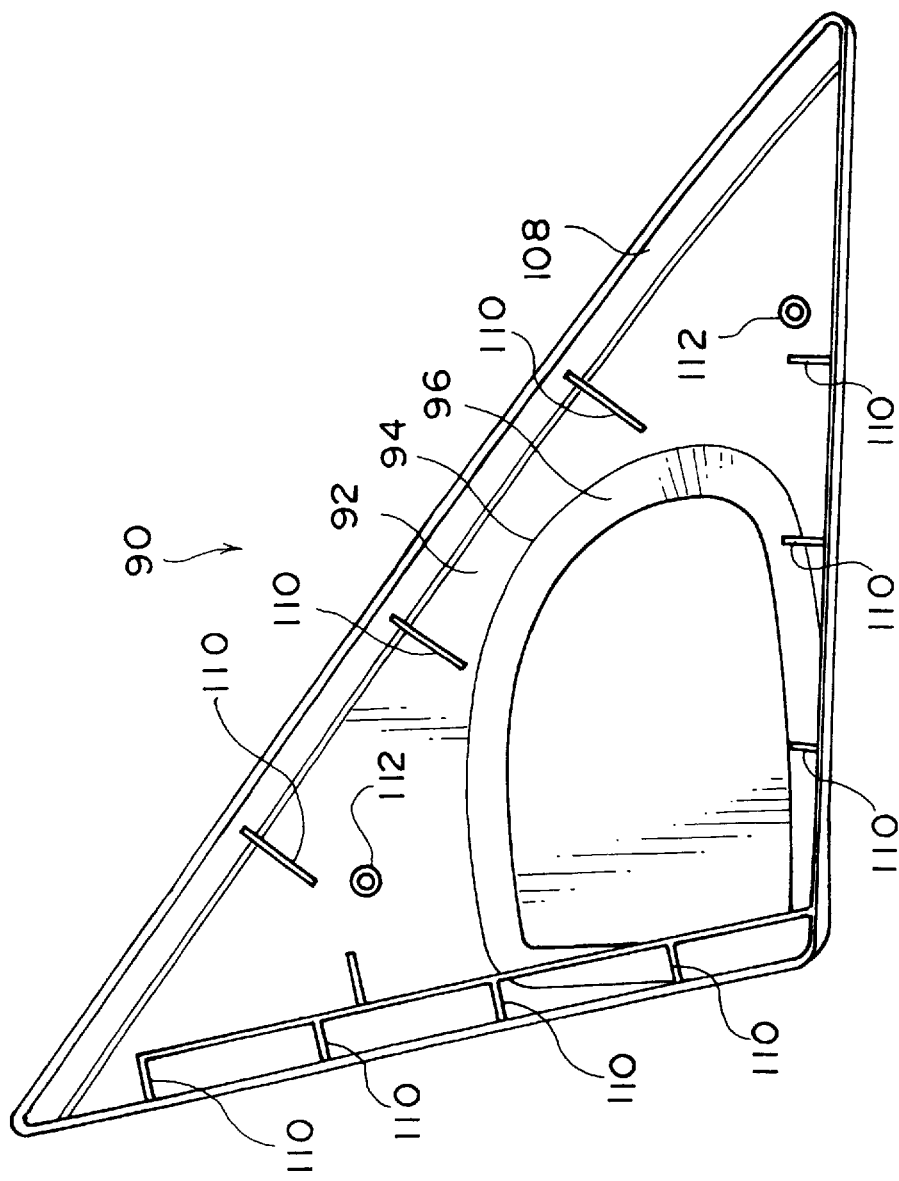
FIG. 11 is a side view of a cover (stay cover) as seen from the vehicle body.

As shown in FIGS. 1 and 11, the stay cover 90 has a plate-shaped base portion 92. The base portion 92 is formed in a substantially triangular shape which is substantially similar to the base portion 52 of the base 50, but which is sufficiently larger than the base portion 52. A through hole 94, which passes through in the thickness direction, is formed in the base portion 92. The through hole 94 is smaller than the base portion 52 of the base 50, but is of a size through which the fixing screws 80 and the base main body 60 of the base 50 can pass. The base main body 60 passes through the through hole 94 and enters into the inner side of the visor 12. The fixing screws 80 pass through the through hole 94 and are screwed together with and fixed to the bosses 82.

Figure 12:
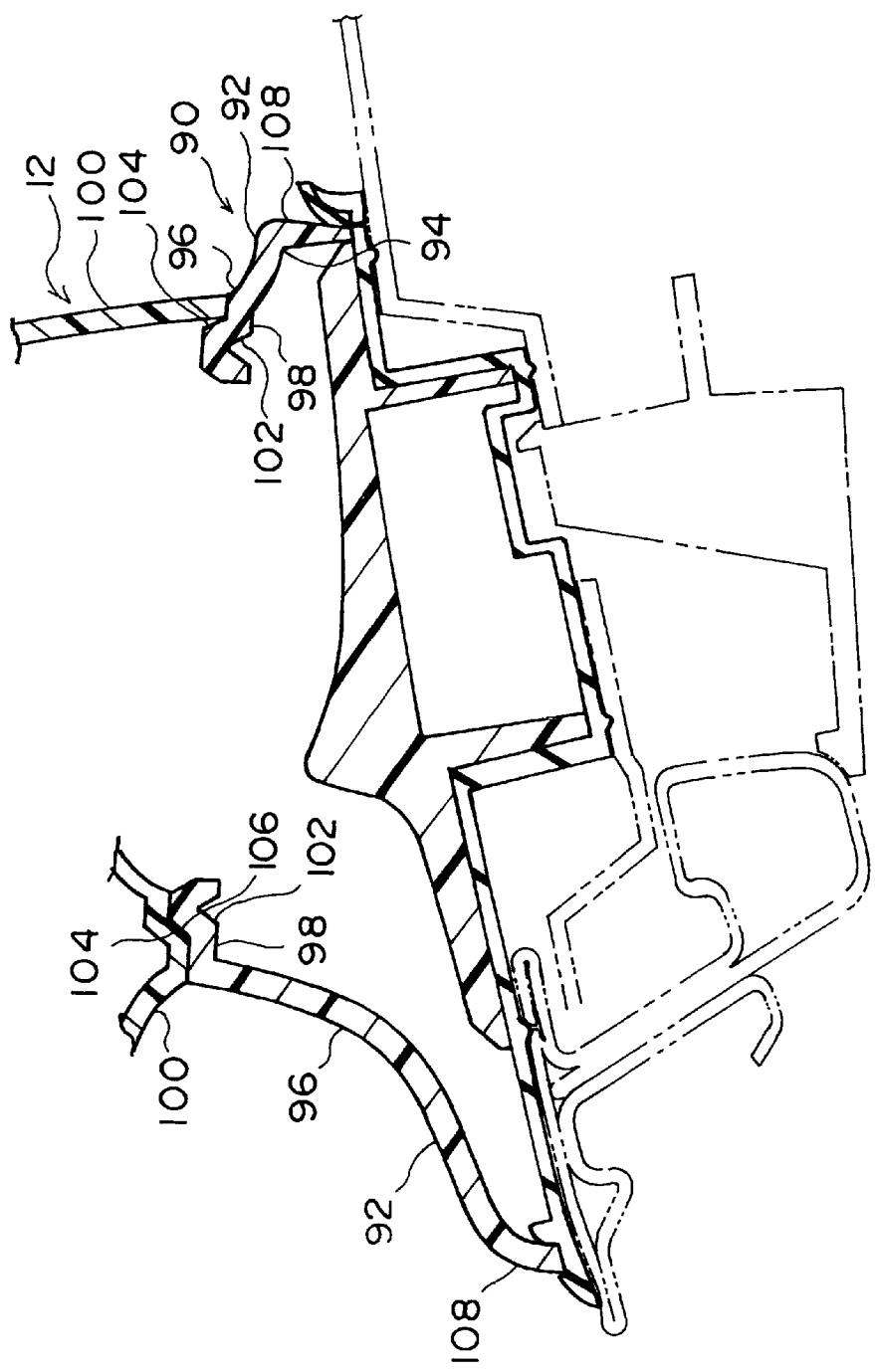
FIG. 12 is an enlarged cross-sectional view in a vicinity of press-contacting portions of the cover and the visor.

Further, a peripheral wall 96 is formed along the inner peripheral portion of the through hole 94 at the thickness direction other side of the base portion 92 (i.e., at the side opposite the vehicle body). As is shown in FIG. 12 in which main portions are illustrated in an enlarged manner, a substantially ring-shaped visor receiving portion 98 is formed at the opening end of the peripheral wall 96. In the state in which the door mirror 10 is assembled, the opening end of a peripheral wall 100, which is formed at the side wall 36 of the visor 12, press-contacts the visor receiving portion 98.

As shown in FIG. 12, a bent portion 102, which is bent toward the visor 12 with respect to the opening radial direction inner side, is provided at the opening radial direction intermediate portion of the visor receiving portion 98. The surface, at the visor 12 side, of the bent portion 102 is an inclined surface 104 which is directed toward the opening radial direction outer side of the visor receiving portion 98 with respect to the visor 12 side, and which serves as a press-contact surface or a positioning portion.

An inclined surface 106, which opposes the inclined surface 104 and which serves as a press-contact surface or a positioning portion, is formed at one portion of the peripheral wall 96 of the stay cover 90 so as to correspond to the inclined surface 104. In the state in which the door mirror 10 is assembled, the inclined surface 104 and the inclined surface 106 press-contact one another.

As shown in FIGS. 1 and 11, a peripheral wall 108 is formed along the outer peripheral portion of the base portion 92 at one thickness direction side of the base portion 92. A plurality of ribs 110 stand upright from the base portion 92 at the inner side of the peripheral wall 108. In the state in which the door mirror 10 is assembled, the base portion 52 of the base 50 press-contacts the ribs 110.

A pair of positioning pins 112 stand upright from one thickness direction side of the base portion 92. Positioning holes 114 are formed in the base portion 52 of the base 50 so as to correspond to the positioning pins 112. Due to the positioning pins 112 passing through the positioning holes 114 and the base portion 52 abutting the ribs 110, the relative positional relationship of the base portion 52 with respect to the base portion 92 (i.e., the relative positional relationship of the base 50 with respect to the stay cover 90) is determined.

<Operation and Effects of the Present Embodiment From the Standpoint of Assembly>

Next, the operation and effects of the present embodiment from the standpoint of assembly will be described by an overview explanation of assembly of the door mirror 10.

In the door mirror 10, the base main body 60 of the base 50 is passed through the through hole 94 formed in the stay cover 90. Next, while the positioning pins 112 formed at the base portion 92 of the stay cover 90 are passed through the positioning holes 114 formed in the base portion 52 of the base 50, the base portion 52 of the base 50 abuts the ribs 110, and positioning of the base 50 with respect to the stay cover 90 is carried out.

Then, the base main body 60 is made to pass through the opening portion 38 formed in the side wall 36 of the visor 12, and the opening end of the peripheral wall 100 of the visor 12 is made to coincide with the opening end of the peripheral wall 96 of the stay cover 90.

In this state, the fixing screws 80 are passed through the through holes 78 formed in the base portion 52 of the base 50. The fixing screws 80 are screwed into and fastened to and fixed to the bosses 82 formed at the visor 12.

Here, the fixing screws 80 are screwed into the bosses 82 until the opening end of the peripheral wall 96 of the stay cover 90 press-contacts the opening end of the peripheral wall 100 of the visor 12 and the base portion 52 of the base 50 press-contacts the ribs 110, i.e., until the base portion 52 of the base 50 and the peripheral wall 100 of the visor 12 nip the stay cover 90 with a nipping force of a predetermined magnitude.

As described above, in the state in which the visor 12, the stay cover 90, and the base 50 are assembled together, the mirror driving unit 26 and the mirror main body 30 are assembled within the visor 12.

In this way, at the door mirror 10, due to the stay cover 90 being nipped by the base portion 52 of the base 50 and the peripheral wall 100 of the visor 12, the stay cover 90 is held between the base 50 and the visor 12. Thus, there is no need for a special fixing member for fixing the stay cover 90. The number of parts of the members forming the door mirror 10 can be reduced, and costs can be reduced.

Basically, the fixing screws 80 are members for fixing the base 50 and the visor 12. The screwing of the fixing screws 80 into the bosses 82 is the process for fixing the base 50 and the visor 12. However, because the stay cover 90 can be fixed in this process, there is no need for a special process for fixing the stay cover 90. As a result, the number of processes for assembling the door mirror 10 can be reduced, which contributes to a reduction in costs.

The direction of nipping of the stay cover 90 by the visor 12 and the base 50 substantially coincides with the direction in which the fixing screws 80 are screwed into the bosses 56. Thus, it is easy to adjust the nipping force of nipping the stay cover 90. Further, because the direction of nipping by the visor 12 and the base 50 substantially coincides with the screwing-in direction of the fixing screws 80, basically, assembly from one direction is possible, and thus, the workability improves.

Moreover, when the peripheral wall 100 of the visor 12 and the peripheral wall 96 of the stay cover 90 press-contact one another, at a portion thereof, the inclined surface 104 of the peripheral wall 96 and the inclined surface 106 of the peripheral wall 100 press-contact one another. In this way, because the direction of press-contact of the inclined surfaces 104, 106 is inclined with respect to the direction of application of the nipping force, stress can be dispersed at the inclined surface 106. Thus, it is possible to prevent or lessen the generation of strain at the press-contact portion of the stay cover 90 or the like. The stay cover 90 and the visor 12 can thereby be made to press-contact each other with no gaps therebetween, and the external appearance can be improved.

<Operation and Effects of the Present Embodiment From the Standpoint of External Appearance>

Next, the operation and effects of the present embodiment will be described from the standpoint of the external appearance of the door mirror 10.

In the present embodiment, the shielding rib 34, which is formed to project from at least a portion of the vehicle body side of the inner peripheral portion of the visor 12 further toward the bottom portion 14 side of the visor 12 than the mirror main body 30, is positioned, with respect to the gap between the inner peripheral portion of the visor 12 and the outer peripheral portion of the mirror main body 30, at the bottom portion 14 side along the direction of opening of this gap. Accordingly, the mirror driving unit 26, the wiring for the mirror driving unit 26, and the like, which are housed at the inner side of the visor 12, are positioned at the side of the shielding rib 34 opposite the side at which this gap is formed. Thus, when even viewing the inner side of the visor 12 from the opening end side of the visor 12 via this gap, the inner side of the visor 12 is shielded by the shielding rib 34, and the mirror driving unit 26, the wiring for the mirror driving unit 26, and the like cannot be seen. The overall external appearance of the door mirror 10 thereby improves.

Moreover, the shielding rib 34 is thinner than the visor 12. Thus, the possibility of defects in the external appearance, such as so-called "shrinkage" in the vicinity of the opening portion of the visor 12, arising due to formation of the shielding rib 34 is extremely small, and this contributes to a decrease in costs.

<Operation and Effects of the Present Embodiment From the Standpoint of Function>

Next, the operation and effects of the present embodiment will be described from the standpoint of the function of the door mirror 10.

The door mirror 10 is mounted to a vehicle by the bolts 58 which are provided at the bosses 74 of the base 50. In this way, at the door mirror 10 which is assembled to the vehicle, the great weight of the visor 12, the mirror main body 30, the mirror driving unit 26 and the like is applied at the base portion 52 side of the base main body 60 of the base 50.

Here, at the base portion 52 side of the base main body 60, the great load of the visor 12, the mirror main body 30, the mirror driving unit 26, and the like are greatly applied. However, the base portion 52 of the base main body 60 is formed by the pair of front and rear walls 62 which oppose one another longitudinally. Thus, the strength in a direction along the substantially vertical direction of the vehicle is improved. Further, the first rib 66 is provided between the front and rear walls 62, and the strength in the direction along the substantially vertical direction of the vehicle is further improved. Thus, sufficient strength can be obtained without making the thickness of the base 50 particularly thick, and costs can be decreased, and a contribution is made to lightening of the weight.

On the other hand, while the vehicle is traveling, a large wind pressure during traveling of the vehicle is applied to the distal end side of the base main body 60. However, the distal end side of the base main body 60 is structured by the pair of upper and lower walls 68. Thus, the strength in the direction along the substantially longitudinal direction of the vehicle is improved. Moreover, the second rib 72 is provided between these upper and lower walls 68, and the strength in the direction along the substantially longitudinal direction of the vehicle is further improved. As a result, sufficient strength can be obtained without making the thickness of the base 50 particularly thick, and costs can be decreased, and a contribution is made to lightening of the weight.

The substantially vehicle bottom side is open at the portion at which the longitudinal plates 62 forming the base main body 60 are provided. Thus, even if rain water were to enter into or water drops due to dew condensation were to adhere to the region between the front and rear walls 62, such water drops would fall down and would be able to be drained.

<Variant Example of Second Rib 72>

Figure 13:
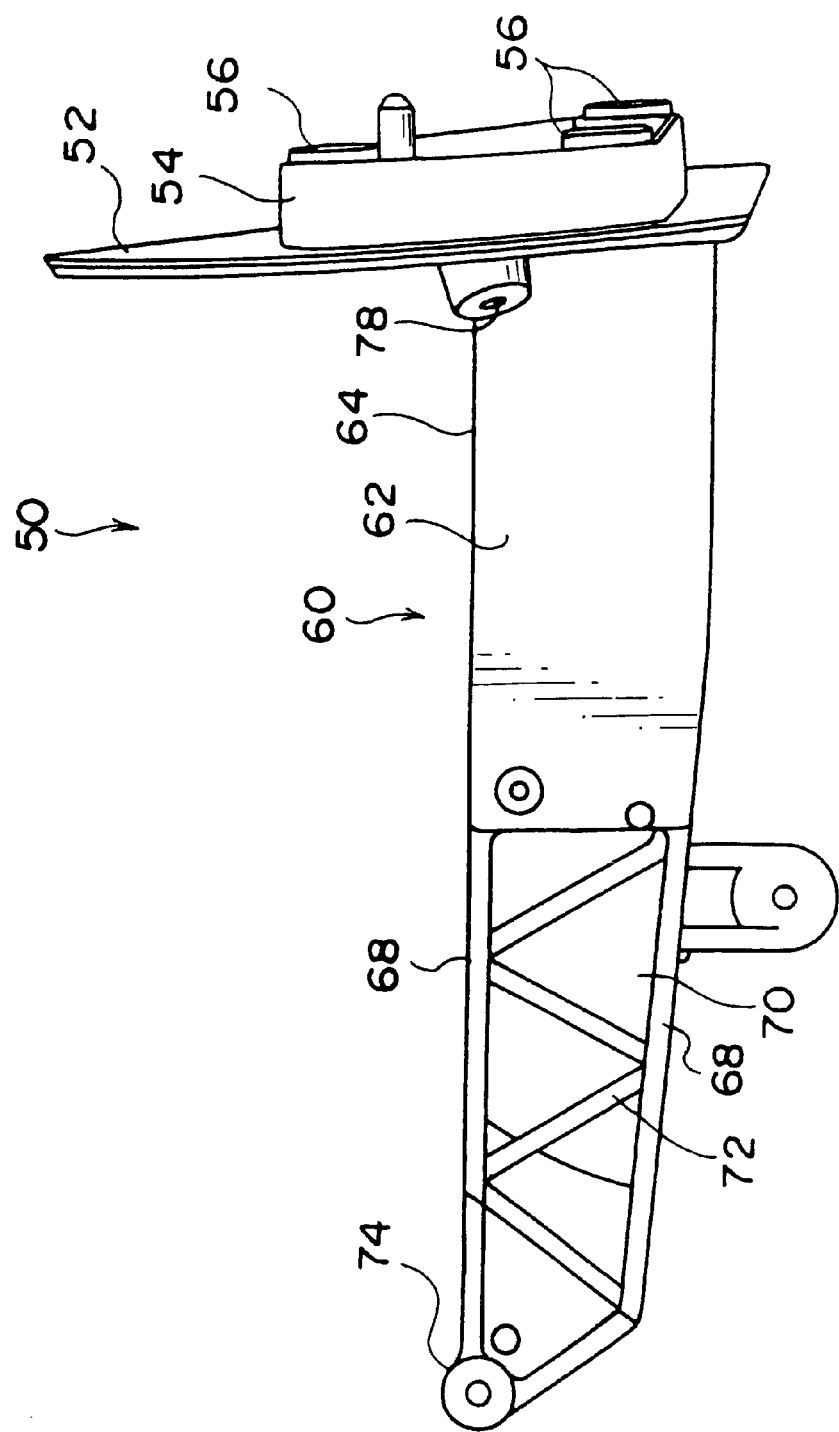
FIG. 13 is a front view which corresponds to FIG. 9 and which illustrates a variant example of a second rib.

Next, a variant example of the present embodiment will be described. A variant example of the second rib 72 is shown in FIG. 13. In this variant example, the second rib 72 is not merely plate-shaped, and is bent in a zigzag between the upper and lower walls 68 at the longitudinal direction intermediate portion thereof.

In this way, by bending the second rib 72 into a zigzag, the additional effect can be obtained that, not only the strength in the direction along the substantially longitudinal direction of the vehicle, but also the strength in the substantially vertical direction of the vehicle and the like can be improved.

This variant example is a variant example of the second rib 72. However, the first rib 66 may be bent in a zigzag between the upper and lower walls 68 at the longitudinal direction intermediate portion thereof. In this case, the additional effect can be obtained that, not only the strength in the direction along the substantially vertical direction of the vehicle, but also the strength in the substantially longitudinal direction of the vehicle and the like can be improved.

As described above, in the present invention, the number of assembly processes of the mirror assembly can be reduced with lower cost, and the assembly's external appearance is also improved.

What is claimed is:

1. A mirror assembly for mounting to a vehicle, the mirror assembly comprising:
    a mirror main body including a reflecting surface;
    a visor housing the mirror main body, and including a vehicle side;
    a base provided at the vehicle side of the visor, fixedly connecting the visor to the vehicle when the assembly is mounted thereto, said base having a base portion connected to the vehicle;
    a cover covering all of the base portion and provided between the visor and the vehicle when the assembly is mounted thereto; and
    a positioning portion provided at at least one of the cover and the visor, the positioning portion engaging with another of the cover and the visor when the assembly is mounted to the vehicle, thereby positioning the other of the cover and the visor with respect to the one of the cover and the visor, with the cover being nipped by the visor and the base, and held therebetween due to nipping force applied by the visor and the base.

2. A mirror assembly according to claim 1, further comprising a fastening device which passes through the cover in one of a direction along and opposite to application of the nipping force, from one of the visor and the base, and which is fastened to the other of the visor and the base, fixing the visor and the base to one another.

3. A mirror assembly according to claim 2, further comprising a mirror driving portion housed at an inner side of the visor and a shielding rib provided at a gap between an inner peripheral portion of the visor and an outer peripheral portion of the mirror main body, concealing the mirror driving portion.

4. A mirror assembly according to claim 1, wherein the positioning portion comprises press-contact surfaces, which press-contact one another along a direction inclined with respect to a direction of application of the nipping force, and the press-contact surfaces are provided further toward an inner side than respective outer peripheral portions of the visor and cover.

5. A mirror assembly according to claim 4, further comprising a mirror driving portion housed at an inner side of the visor and a shielding rib provided at a gap between an inner peripheral portion of the visor and an outer peripheral portion of the mirror main body, concealing the mirror driving portion.

6. A mirror assembly according to claim 5, wherein thickness of the shielding rib is less than thickness of the visor.

7. A mirror assembly according to claim 1, wherein the cover includes a plate-shaped base portion, the base includes a generally triangular plate-shaped base portion, and the positioning portion includes ribs provided upright at the base portion of the cover and has the base portion of the base.

8. A mirror assembly for mounting to a vehicle exterior, the mirror assembly comprising:
(a) a visor housing a mirror;
(b) a base including opposite ends, one end adapted for mounting to the vehicle, with the other end connecting to the visor;
(c) a cover disposed between the visor and the vehicle and covering at least a portion of the base when the assembly is mounted to the vehicle; and
(d) positioning pins provided at at least one of the cover and visor, received at holes defined in the base, substantially positioning the cover according to a predetermined position relative to the visor and base when mounted to the vehicle, and at least a portion of the cover being nipped between the visor and the base for holding the cover.

9. A mirror assembly according to claim 8, further comprising a fastening device which passes through the cover in one of a direction along and opposite to application of the nipping force, from one of the visor and the base, and which is fastened to the other of the visor and the base, fixing the visor and the base to one another.

10. A mirror assembly according to claim 9, further comprising a mirror driving portion housed at an inner side of the visor and a shielding rib provided at a gap between an inner peripheral portion of the visor and an outer peripheral portion of the mirror, concealing the mirror driving portion.

11. A mirror assembly according to claim 8, wherein the positioning portion comprises press-contact surfaces, which press-contact one another along a direction inclined with respect to a direction of application of the nipping force, and the press-contact surfaces are provided further toward an inner side than respective outer peripheral portions of the visor and the cover.

12. A mirror assembly according to claim 11, further comprising a mirror driving portion housed at an inner side of the visor and a shielding rib provided at a gap between an inner peripheral portion of the visor and an outer peripheral portion of the mirror main body, concealing the mirror driving portion.

13. A mirror assembly according to claim 12, wherein thickness of the shielding rib is less than thickness of the visor.

14. A mirror assembly according to claim 8, wherein the cover includes a plate-shaped base portion, the base includes a generally triangular plate-shaped base portion, and the positioning portion includes ribs provided upright at the base portion of the cover and has the base portion of the base.

15. A method of assembling a mirror arrangement for a vehicle, the method comprising the steps of:
(a) passing a base main body of a base through a through-hole formed in a stay cover and thereafter positioning the stay cover and base according to a predetermined position relative to one another;
(b) inserting the base main body into an opening portion formed in a side wall of a visor and thereafter arranging a peripheral wall of the visor and a peripheral wall of the stay cover to substantially coincide; and
(c) fastening the base and the visor with a base portion of the base and the peripheral wall of the visor nipping the stay cover therebetween after the step of inserting the base main body into said opening portion such that said stay cover completely covers said base portion.

16. A method of assembling a mirror arrangement according to claim 15, further comprising the step of mounting a mirror driving portion and a mirror main body at an inner portion of the visor.

17. A method of assembling a mirror arrangement according to claim 15, wherein in the step of fastening the base, an opening end of the peripheral wall of the stay cover press-contacts an opening end of the peripheral wall of the visor, and the base portion of the base is press-contacted by a rib.

18. A method of assembling a mirror arrangement according to claim 17, further comprising the step of press-contacting an inclined surface of the peripheral wall of the visor and an inclined surface of the peripheral wall of the stay cover against one another, with a direction of press-contacting of the inclined surfaces is inclined with respect to a direction in which the stay cover is nipped.

19. A method of assembling a mirror arrangement according to claim 15, wherein the step of inserting the base main body includes passing a screw through a through-hole formed in the base portion of the base and threading the screw into a boss formed at the visor.

20. A method of assembling a mirror arrangement according to claim 19, wherein a direction of nipping of the stay cover by the visor and the base substantially coincides with longitudinal direction of the screw when threaded into the boss.

* * * * *